United States Patent Office 3,181,478
Patented May 4, 1965

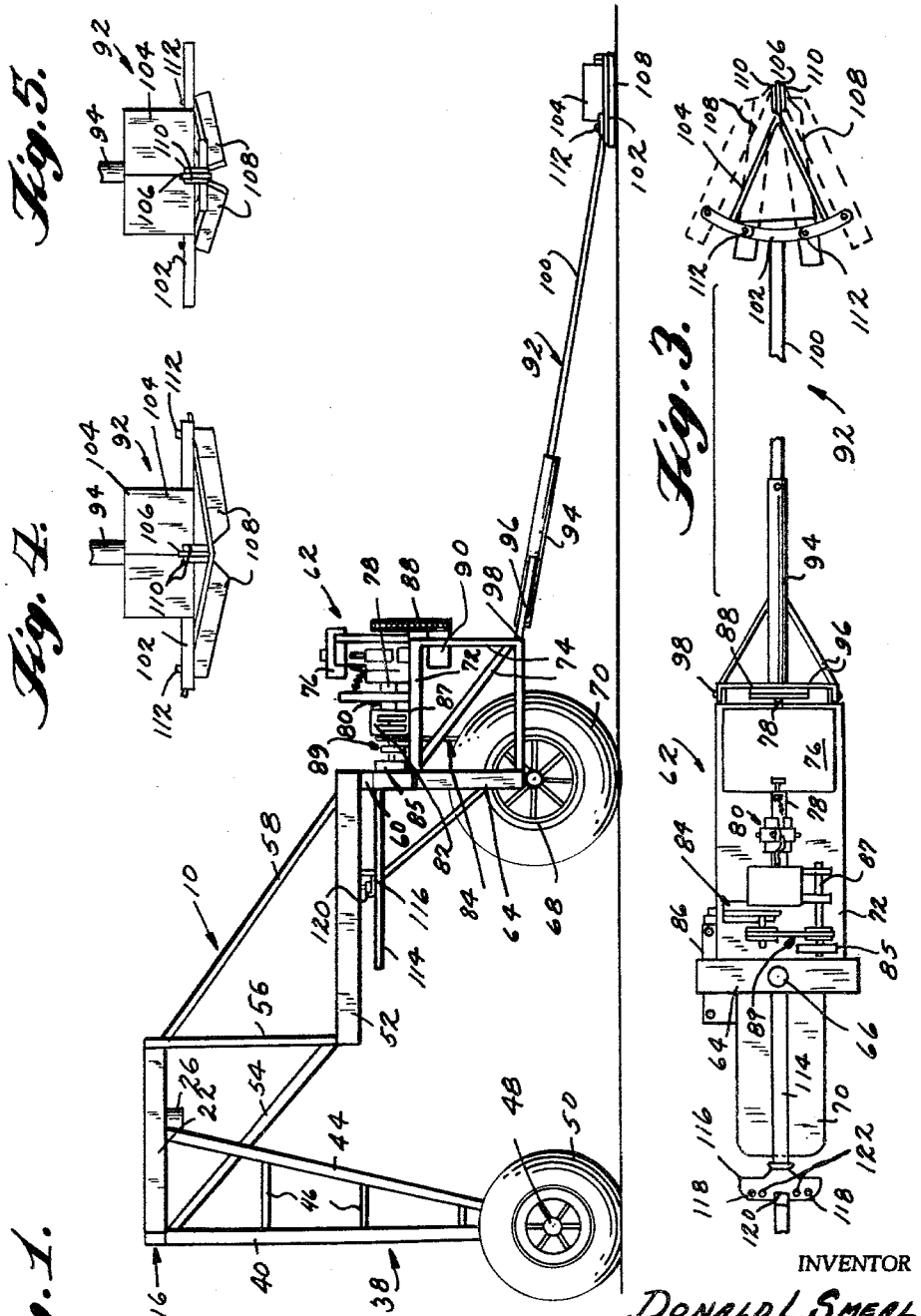

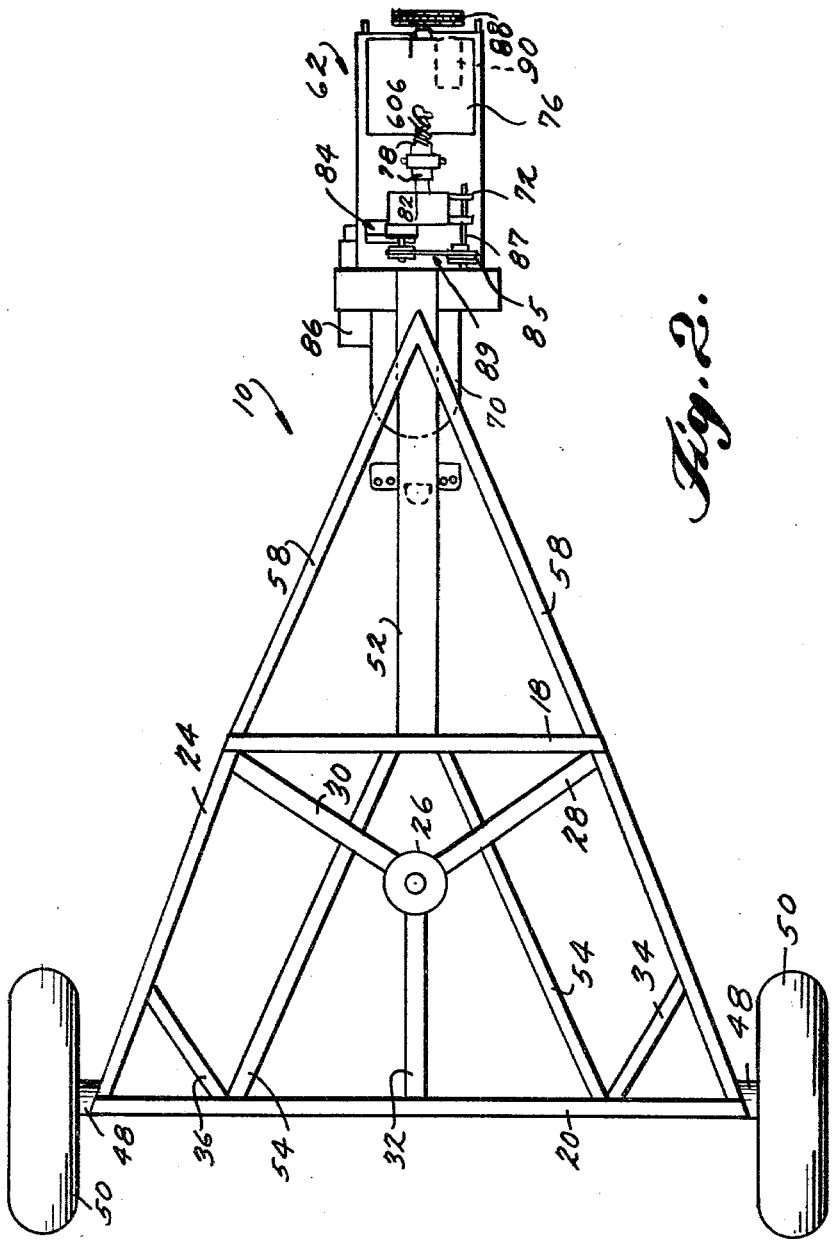

3,181,478
MECHANISM FOR STEERING A VEHICLE IN AN AGRICULTURAL FIELD
Donald L. Smeal, Snyder, Nebr., assignor, by mesne assignments, to L. R. Nelson Mfg. Co., Inc., Peoria, Ill.
Original application Dec. 29, 1958, Ser. No. 783,299, now Patent No. 3,082,883, dated Mar. 26, 1963. Divided and this application Mar. 19, 1963, Ser. No. 281,073
8 Claims. (Cl. 104—244.1)

This invention relates to vehicles of the type adapted to be operated in agricultural fields and more particularly to furrow guided steering means for such vehicles.

This application is a division of my application Serial No. 783,299, filed December 29, 1958, which issued on March 26, 1963 as Patent No. 3,082,883.

The above-mentioned patent discloses an irrigation pipe moving apparatus including a vehicle having furrow guided steering means for directing the movement of the vehicle without the necessity of a manual steering operation.

An object of the present invention is the provision of a vehicle steering mechanism of the type described which is particularly useful in an irrigation pipe moving apparatus.

Another object of the present invention is the provision of a steering mechanism of the type described having means embodied therein for limiting the steering movements during furrow guided operation.

Another object of the present invention is the provision of a furrow guided steering mechanism of the type described which is simple in construction, effective in operation and economical to manufacture and maintain.

These and other objects of the present invention will become more apparent during the course of the following detailed description and appended claims.

The invention may best be understood with reference to the accompanying drawings, wherein an illustrative embodiment is shown.

In the drawings:

FIGURE 1 is a side elevational view of a vehicle embodying the principles of the present invention;

FIGURE 2 is a top plan view of the vehicle with a portion of the vehicle steering assembly removed;

FIGURE 3 is an enlarged fragmentary top plan view of the vehicle steering assembly showing the manner in which it is connected with the forward steerable wheel of the vehicle;

FIGURE 4 is a front elevational view of the furrow engaging means of the steering assembly showing the same in one position of adjustment; and FIGURE 5 is a view similar to FIGURE 4 showing the furrow engaging means in another position of adjustment.

Referring now more particularly to the drawings, there is shown therein an apparatus embodying the principles of the present invention. The apparatus, in general, includes a self-propelled, steerable, wheeled vehicle, generally indicated at 10, which is particularly operable to move between rows of corn or the like along a predetermined path parallel to the rows. The vehicle 10 is particularly adapted to receive an elongated boom assembly (not shown) which is capable of tilting movement in an upright plane and swinging movement about an upright axis of the type which is disclosed in detail in the aforesaid Patent No. 3,082,883. As disclosed in the patent, a boom assembly has movably mounted thereon a carriage assembly for engaging pipe sections and carrying the same from a previous position of use to a new position of use laterally removed therefrom in the field. It will be understood that while the vehicle as shown is particularly adapted for use as part of a pipe carrying apparatus as described above, it is susceptible to general agricultural use. The vehicle 10 comprises an upper horizontal frame section 16, which may be of any suitable construction and, as shown in FIGURES 1 and 2, is made up of structural members such as I beams or channels rigidly secured together, as by welding or the like. As best shown in FIGURE 2, the frame section 16 includes forward and rearward horizontal transverse members 18 and 20 rigidly interconnected in spaced relation by a pair of forwardly converging side members 22 and 24. Disposed in the central portion of the horizontal frame section 16 is a vertically extending sleeve 26. The sleeve 26 is provided for the purpose of swivelly receiving the boom assembly in a manner which is fully described in the aforesaid patent. As shown, the sleeve is rigidly mounted within the frame section by a pair of rearwardly converging support members 28 and 30 having their forward ends rigidly secured to the intersection of the forward transverse frame member 18 and the associated side members 22 and 24 and their rearward ends rigidly secured to the sleeve. In addition, a central longitudinal member 32 has its forward end rigidly secured to the sleeve 126 and its rearward end is secured to the central portion of the rearward transverse member 20. If desired, diagonal corner braces 34 and 36 are rigidly secured to the rearward end of the frame section between the side members and the rear transverse member 20.

The horizontal frame section 16 is maintained in a position above ground level sufficient to permit the passage of corn stalks thereunder during the traversal of the vehicle through the field. To this end, the rearward end of the horizontal frame section has a pair of wheel-supporting structures 38 extending downwardly from each rearward corner thereof. Preferably, each wheel supporting structure is made up of a central tubular member 40 extending vertically downwardly from the associated corner of the horizontal frame section and a pair of downwardly converging tubular members 42 and 44 having their upper ends secured respectively to the rear transverse frame member and the associated end frame member and their lower ends extending adjacent the lower end of the central tubular member 40. The three tubular members 40, 42 and 44 may be suitably braced by horizontal braces 46 or the like, if desired. Mounted on the lower end of each wheel supporting structure 38 is a horizontally extending axle or stub shaft 48 having a wheel 50 journalled on the outwardly extending end thereof.

Disposed forwardly and below the upper horizontal frame section 16 in the central portion of the vehicle is a central tubular frame member 52. The member 52 is rigidly secured to the upper frame section by any suitable means, such as three pairs of upwardly diverging supporting arms 54, 56 and 58. The converging forward ends of the supporting arms 54 are rigidly secured to the rear end of the tubular frame member 52 and extend upwardly and rearwardly for rigid securement to the rear transverse frame member 20 of the horizontal frame section 16. The intermediate supporting arms 56 have their lower converging ends secured to the frame member 52 adjacent the support arms 54 and extending vertically upwardly for rigid engagement with the forward transverse frame member 18 of the horizontal frame section 16. The forward supporting arms 58 have their lower converging ends rigidly secured to the forward end of the frame member 52 and extend upwardly and rearwardly for rigid securement to the forward transverse frame member of the horizontal frame section 16. Extending downwardly from the forward end of the central tubular frame member 52 is a spindle or stub shaft 60 which is arranged to receive a tractor unit of the vehicle, generally indicated by the numeral 62.

The tractor unit includes a yoke 64 having a sleeve 66 rigidly secured to the bight portion thereof and extending upwardly therefrom to receive the spindle 60. Mounted within the lower ends of the legs of the yoke 64 is an axle or stub shaft 68 having a driving wheel 70 journalled thereto and connected by a driving lug with removable pin.

A motor supporting platform 72 is rigidly secured to the upper end of the yoke 64 and suitably supported in a horizontal position above the wheels 70 by any suitable means such as braces 74 or the like (see FIGURE 1). The platform 72 carries, at its forward end, a motor, preferably in the form of an internal combustion engine 76 having an output shaft 78 connected, through a clutch assembly 80, to the input shaft of a gear box 82. The output shaft of the gear box is connected, as by a sprocket and chain assembly 84, to the input shaft of a worm drive gear box 86 of conventional construction connected with the wheel axle 68. A flywheel 85 is mounted, as by a shaft 87 suitably journalled on the platform, for rotation by and with the output shaft of the gear box 82 as by a chain and sprocket assembly 89, if desired and an adjustable friction brake or shoe (not shown) on the flywheel can be provided for control of the flywheel effect, such brake shoe being connected to the engine clutch in such manner that it will not be against the flywheel or effective when the clutch is engaged. In addition, the output shaft 78 of the motor is also connected, as by a belt and pulley assembly 88, with an electric generator 90 suitably mounted on the bracing structure of the horizontal platform 72.

In order to effect automatic steering of the vehicle along the furrow between rows of corn or the like, there is provided an automatic steering means, generally indicated at 92. As best shown in FIGURES 1 and 3–5, the steering means 92 includes a sleeve 94 having its rearward end rigidly secured to a bracket structure 96 pivotally secured, as at 98, to the brace structure of the horizontal platform 72 for pivotal movement in a vertical plane about a horizontal transverse axis. Adjustably telescopically mounted within the forward end of the sleeve 94 is the rear end of a steering bar or pipe 100, the forward end of which is rigidly secured to an arcuate bar 102. The rearward end of a ballast box 104 is rigidly secured, as by welding or the like, to the arcuate bar 102 and has a lug 106 rigidly secured to its forward end and extending forwardly therefrom. Mounted below the ballast box 104 and the arcuate bar 102 is a pair of rearwardly diverging runners 108. As best shown in FIGURES 4 and 5, each of the runners 108 is formed from an angle iron with one flange thereof extending vertically downwardly for engagement with the ground and having its forward end tapered rearwardly. The runners 108 are angularly adjustable with respect to each other by any suitable means and, as shown, the forward ends of the runners are secured to the lug 106, as by upstanding lugs 110 suitably fastened to the lug 106. The rearward ends of the runners are adjustably secured, as by bolts 112 or the like to different positions spaced along the arcuate extent of the bar 102.

In order to limit the turning movement of the wheel 70, when the steering means 92 is in operation, and to provide a means for steering the wheel, when steering means 92 is not used, there is provided a tiller bar 114 which has its forward end rigidly secured to the yoke 64 and extends rearwardly therefrom. A plate 116 is rigidly mounted below the central tubular frame member 52 and is provided with a series of transversely spaced openings 118. An L-shaped bar 120 is rigidly secured to the tiller bar intermediate its ends above the upper surface of the plate 116. It will be seen that by inserting pins 122 in selected openings 118 in a position to be engaged by the bracket 120, the pivotal movement of the tractor unit 62 about the axis of the sleeve 60 can be adjustably limited.

Of course, by removing the pins 122 turning movement of the tractor unit is not so restricted and therefore the unit can be steered manually through the tiller bar 114 by an attendant stationed on the frame. In this regard, the drive wheel 70 is provided with a removable pin (not shown) so that the driving engagement of the motor 76 with the front wheel 70 can be disengaged for the purpose of permitting the vehicle to be freely towed by a tractor or the like.

During the forward movement of the vehicle it will be noted that the runners 108 engage with the furrow between the corn rows and tend to center themselves therein. The runners are connected with the tractor unit so as to steer the driving wheel 70 and in this way the vehicle is automatically steered along the furrow. It will be noted that the runners are adjustable in width as shown in dotted lines in FIGURE 4 and illustrated in FIGURES 5 and 6, and this adjustment makes it possible to adapt them to various conditions in the furrow. It is also possible to vary the amount of ballast placed in the ballast box 104 for proper results in varying soil conditions.

When it is desired to tow the vehicle from one field to another the guiding assembly is removed, by removing steering bar or pipe 100 from sleeve 94 and replacing with a conventional towing hitch similarly connected to sleeve 94 permitting connection to the draw bar of a tractor or the like. Preferably a driving lug on the front wheel is removed to permit the same to rotate freely. Finally, the stop pins 122 are removed to permit a greater steering movement of the front wheel.

It will thus be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. In an apparatus, the combination comprising a vehicle frame, ground engaging wheels mounted on the rear end of said frame, forward wheel means, means mounting said forward wheel means on the forward end of said vehicle frame for pivotal movement about an upright axis, motor means carried by said mounting means drivingly connectible with said forward wheel means for propelling said vehicle frame, furrow engaging means disposed in advance of said forward wheel means, means connecting said furrow engaging means with said mounting means for pivotal movement with said forward wheel means about said upright axis and for vertical movement independent of said mounting means and said forward wheel means, and means for limiting the pivotal movement of said forward wheel means about said upright axis, said limiting means comprising a tiller bar fixed to said mounting means for movement therewith about said upright axis, a plate fixed to said frame adjacent the outer end of said tiller bar and a pair of pins removably engageable with said plate on opposite sides of said tiller bar for engagement by the latter.

2. The combination as defined in claim 1 wherein said mounting means comprises a yoke having a pair of spaced downwardly extending arms and an upwardly extending shaft journaled in the forward end of said frame and wherein said forward wheel means comprises a single wheel rotatably mounted between said arms.

3. The combination as defined in claim 1 wherein said furrow engaging means comprises a pair of rearwardly diverging runners.

4. The combination as defined in claim 3 wherein said runners are formed of angle irons having a horizontal flange and a vertical flange extending downwardly therefrom.

5. The combination as defined in claim 3 wherein said furrow engaging means further includes means for maintaining said runners in different positions of angular adjustment with respect to each other.

6. The combination as defined in claim 3 wherein said furrow engaging means includes ballast containing means.

7. The combination as defined in claim 1 wherein said furrow engaging means connecting means comprises a tongue pivotally connected at its rear end to said mounting means for movement about a horizontal transverse axis and carrying said furrow engaging means at its forward end.

8. In combination, a vehicle frame, forward and rearward wheel means supporting the vehicle frame for movement along a field for the purpose of performing a field operation during movement at a speed substantially less than that normally desired during road travel of the vehicle and along a predetermined path in the field of operation as determined by a furrow formed therein, means carried by said vehicle frame and operatively connected with at least one of said wheel means for effecting a driven rotational movement of said one wheel means at a speed such as to propel said frame at said operational speed, said means for driving said one wheel means being of a capacity less than that required to propel the vehicle frame at said road travel speed, means mounting said forward wheel means on the forward end of said vehicle frame for pivotal steering movements about an upright axis, an elongated rigid structure extending forwardly of said forward wheel means and operatively connected therewith to effect pivotal steering movements of the latter in response to horizontal swinging movements of said elongated rigid structure, furrow engaging means mounted on the forward portion of said elongated rigid structure, and means connecting the rearward end of said elongated rigid structure with said forward wheel means mounting means for independent vertical swinging movement into a first operative position wherein said furrow engaging means is disposed in a furrow in a field so as to effect the steering movements of said forward wheel means in response to changes in the contour of the furrow during movemnet in the field at said operational speed and a second operative position wherein said furrow engaging means is out of contact with the field and said elongated rigid structure is pivotally connected in trail-behind relation to a propelling vehicle capable of effecting movement at a desired road travel speed.

References Cited by the Examiner
UNITED STATES PATENTS

| 1,041,086 | 10/12 | Hoyland | 180—79.4 |
| 1,041,191 | 10/12 | Suhl | 180—79.4 |
| 2,555,793 | 6/51 | Frye | 104—244.1 |
| 2,811,089 | 10/57 | Blackstone | 104—244.1 |

LEO QUACKENBUSH, *Primary Examiner.*